US008243930B2

(12) United States Patent
Harris

(10) Patent No.: US 8,243,930 B2
(45) Date of Patent: Aug. 14, 2012

(54) COUNTERFEIT PREVENTION SYSTEM BASED ON RANDOM PROCESSES AND CRYPTOGRAPHY

(75) Inventor: Scott C. Harris, Rancho Santa Fe, CA (US)

(73) Assignee: Harris Technology, LLC, Rancho Santa Fe, CA (US)

( * ) Notice: Subject to any disclaimer, the term of this patent is extended or adjusted under 35 U.S.C. 154(b) by 948 days.

(21) Appl. No.: 11/688,801

(22) Filed: Mar. 20, 2007

(65) Prior Publication Data

US 2009/0100271 A1 Apr. 16, 2009

(51) Int. Cl.
*H04L 9/00* (2006.01)

(52) U.S. Cl. ........................................................ 380/263

(58) Field of Classification Search .................. 713/175; 455/296

See application file for complete search history.

(56) References Cited

U.S. PATENT DOCUMENTS

| | | | | |
|---|---|---|---|---|
| 5,201,000 | A * | 4/1993 | Matyas et al. | 380/30 |
| 5,367,148 | A * | 11/1994 | Storch et al. | 235/375 |
| 6,226,619 | B1 * | 5/2001 | Halperin et al. | 705/1 |
| 6,996,543 | B1 * | 2/2006 | Coppersmith et al. | 705/50 |
| 7,471,714 | B2 * | 12/2008 | Umeno | 375/140 |
| 7,627,126 | B1 * | 12/2009 | Pikalo et al. | 380/279 |
| 2001/0046293 | A1 * | 11/2001 | Gleeson | 380/44 |
| 2002/0178364 | A1 * | 11/2002 | Weiss | 713/182 |
| 2003/0182246 | A1 * | 9/2003 | Johnson et al. | 705/76 |
| 2003/0224751 | A1 * | 12/2003 | Vanderhelm et al. | 455/296 |
| 2005/0090233 | A1 * | 4/2005 | Chambers et al. | 455/412.1 |
| 2005/0234823 | A1 * | 10/2005 | Schimpf | 705/50 |

FOREIGN PATENT DOCUMENTS

| | | |
|---|---|---|
| WO | WO9904364 | 1/1999 |
| WO | WO 9904364 A1 * | 1/1999 |

OTHER PUBLICATIONS

"Suggestions for Random Number Generation in Software" by Tim Matthews, RSA Data Security Inc. , Dec. 1995.*

* cited by examiner

*Primary Examiner* — Brandon Hoffman

(74) *Attorney, Agent, or Firm* — Law Office of Scott C. Harris, Inc.

(57) ABSTRACT

A first portion of a label is formed using a chaotic process that cannot be controlled and forms a portion of the label using the chaotic information. A prospective counterfeiter cannot control the first portion of the label, and hence can only form a different random portion. A private encryption key is used to encrypt information indicative of the random portion. That encrypted information is placed on the same label. That encrypted information can be decrypted by a user using a public key, and compared with the random portion. If they agree, then the label is genuine, and the product has not been counterfeited. Since the random information cannot be replicated exactly, there is no way to copy this label and its encrypted portion exactly onto another product or label.

15 Claims, 2 Drawing Sheets

COUNTERFEIT PREVENTION SYSTEM BASED ON RANDOM PROCESSES AND CRYPTOGRAPHY

BACKGROUND

Counterfeit name brand items are prevalent. Sometimes the counterfeit items use packaging that is identical to the legitimate version, and virtually undetectable from the packaging of the authentic item. For example, counterfeit name brand items such as perfumes, ink cartridges, toner cartridges, and other consumables, sunglasses, clothing, women's purses and the others, may be made in a way where the packaging is impossible to detect from the original.

Sometimes, even legitimate retailers are fooled. Many retailers buy through wholesalers or other middlemen. Unless the reseller gets the product directly from the manufacturer, they may be fooled by a good copy from their supplier. Even when the retailers think they are buying from the manufacturer, they may be fooled by a phishing or other scam into buying counterfeit items.

The problem is even worse for consumers. Consumers can virtually never be sure that an item they are buying is genuine. Virtually any kind of packaging can be copied by a sufficiently determined copier.

SUMMARY

The present application describes using a cryptography application to ensure that an item is genuine. According to the present system, labels or other indicia are associated with unique codes that can not be replicated.

In an embodiment, a first code is formed by a chaotic process that can not be forged or reproduced. In essence, the first code is absolutely random, and therefore cannot be replicated by a forger.

A second code is formed from the first code, using a public key encryption system. Only the legitimate manufacturer has the private key. Therefore, only the legitimate manufacturer can use their private key to form the second code.

Any user, however, can get the public key, and can use that public key to verify that the second code is actually formed from the first code and is actually genuine. Structure is described herein for determining this. According to one aspect, a clearinghouse system or trusted website system is used. A user can take a photograph of the codes, and send them to the trusted website. In one aspect, the photograph can be taken from a user's personal communication system such as a PDA or cell phone, which carries out a communication such as email or telephone call at a different time.

Another embodiment may use a dedicated scanner system in order to test authenticity of the items.

DETAILED DESCRIPTION

Figure 1:
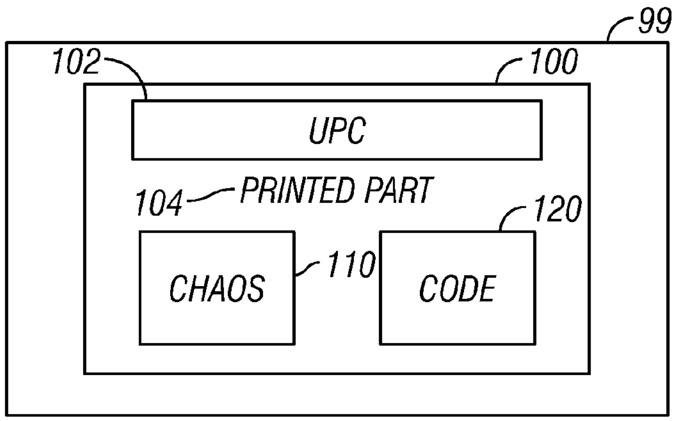
FIG. 1 shows an exemplary label layout.

An embodiment is shown in FIG. 1 which illustrates an item 99, and a identifying label 100. The term "label" is used herein, but it should be understood that the label can in fact be an electronic file, or can be a conventional paper label. In the embodiment, the label 100 is a paper sticker that is stuck to the item 99. The label 100 may include a number of readable portions including a UPC code 102, a printed part 104 that says in text some information about what the item is, as well as the cryptographic code portion. The cryptographic code portion includes a chaos portion 110, and a code portion 120.

The chaos portion is a portion which is formed totally or partially using random processes. The properties of chaos cause the code to include a layout which is wholly chaotic, and cannot be reproduced or regularized by any function. Example chaotic functions which can be used may include for example, a drip from water or some other fluid like ink. Details of spray from a nozzle, such as an inkjet nozzle or other nozzle can be used. Crack patterns that cause or are formed in certain materials drying can be used. Therefore, an ink can be sprayed on with specified functions that cause it to crack according to random processes. Similarly, a polymer or other curing material can be used to form crack patterns or other texture patterns. Many other chaotic or random functions are known. An important feature of the chaos function is that it will form a non-predictable part each time. There is no way for an attempted copier to reproduce any specific chaos function. While two of the functions may be the same through coincidence, there is no way to predict what the function will be in advance or to force it to be the same as some other function.

The code portion 120 is a printed value that is representative of information in the chaos function, encrypted using the private key of a public key system. Alternatively, any cryptographic system can be used. For example, there are many cryptographic systems which are in effect one-way: the public has the capability of carrying out one function on them but not the other. A typical use for such cryptographic systems is in a public key system, where at least some users are given the public key, and can hence decode messages that are encoded using the owner's private key. However, only the authorized user can encode those messages using their own private key.

A one-way private function is used to form the code 120. In one embodiment, a bitmap image of the chaotic function may be formed, and that bitmap image is then encoded using the private key. Other embodiments may obtain different information indicative of the chaos function, and encode that information using the private key to form the code. The code 120 may be printed as a number, or any machine-readable function. For example, this may use a barcode; either one or two-dimensional, or may use any other image based system that can encode information.

In one particular embodiment, both the code portion 120 and the chaos portion 110 are stickers that are stuck onto the printed part. This all may be formed as one unit. In addition, while the above shows embodiments where the chaos portion is a specified portion of the label, the chaos portion may actually be part of the object, e.g. part of the design on the object itself, or the way that the material seams meet or fit, or some other function. Alternatively, it can be printed anywhere.

Note that even though an image of the chaos portion is obtained for purposes of authenticity verification, an image inherently cannot be securely used for the chaos portion in this embodiment. The chaos portion must be formed naturally, so that the chaotic processes change the way the portion looks. An image can be electronically manipulated, and hence could be manipulated to have any desired characteristic. While the user may obtain an image of that chaotic portion in order to decode it, the chaotic portion itself is preferably not an image. For example, it may be a polymer or the like or other things described above, and the look of that chaos portion is what is imaged.

The above describes a few different chaos portions that can be used. However, it is contemplated that many and much more difficult-to-copy chaos portions can be used. The key is that the portion is in effect random, so that a user cannot simply copy it.

Figure 2:
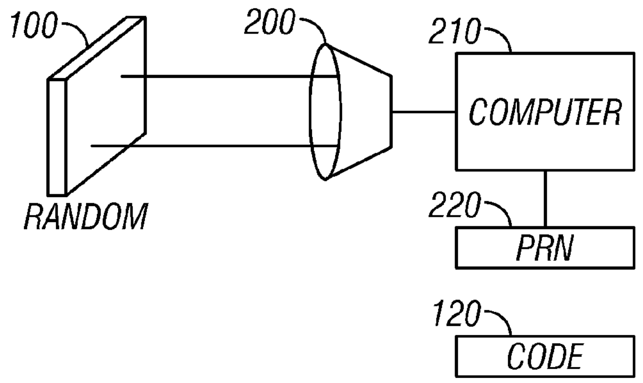
FIG. 2 shows a hardware system for forming the label.
Figure 3:
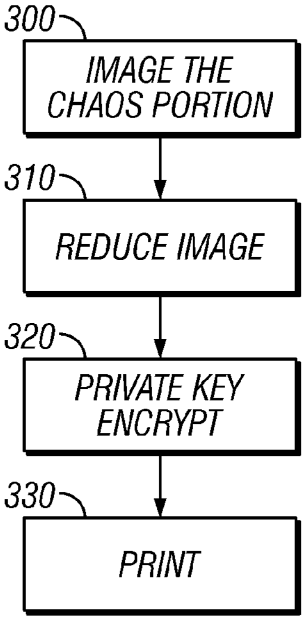
FIG. 3 shows a flowchart of operation of that hardware system.

FIG. 2 illustrates the hardware that can be used to form the code. The chaos portion 110 is imaged by a camera 200 that is connected to a computer 210 running the flowchart of FIG. 3 discussed herein. The computer 210 drives a printer 220 that prints the code 120, for example on a sticker. The printer 220 may alternatively print the code directly onto the same substrate that holds the chaos portion.

The computer operates as follows. At 300, the computer images the chaos portion, forming an image thereof. The image is preferably a bitmap, taken at high resolution. At 310, the image is reduced. This can use any of a number of different techniques of reducing the image. In an embodiment, the image can be reduced according to minutia, so only minutia that have a certain relevance level are maintained in the image. For example, the 10 most relevant image portions may be used. An alternative system may reduce the image according to only specified parts, so only specified features at specified geographic portions of the image may be used. For example, the feature closest to the top right corner may be used, along with the feature closest to the geometrical center. This may also be maintained as a secret, so that the forger does not know which portions of the image are used.

At 320, the private key is used to encrypt those features from the image. As an alternative, specified features of the image may be used to form a number, for example a number of cracks in the image, an average texture of the image, ratios between different parts in the image, average spacing between the items in the image, and the like.

At 330, those features which are encrypted are formed into some readable form, preferably a machine-readable form. The form may be for example, any kind of machine-readable code that represents information. In the embodiment, this may use a barcode type system, which is printed at 330.

Figure 4:
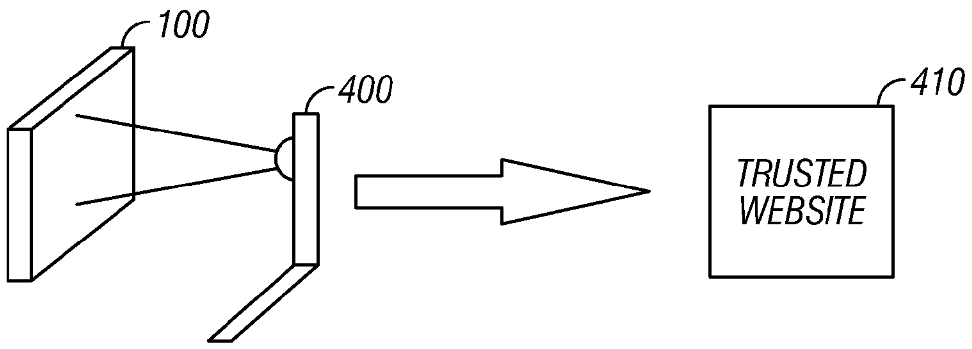
FIG. 4 shows a hardware system for reading the label.

An important part of the operation is how this can be used to verify the authenticity of the object. FIG. 4 illustrates an embodiment. The label 100 is shown in FIG. 4 as being imaged by a personal communication device 400, here a cell phone. The camera in the cell phone obtains an image of the label, which is then sent via e-mail or via Internet access to a trusted website 410. The trusted website may be a clearing house which is established for the purpose of verifying the authenticity of items, and may include the public key used for a number of these items. Different techniques are known in the art for establishing trusted websites, and the process of establishing a trusted website is not discussed in detail herein. For example, in the example of a cell phone, one of the pre-programmed Internet access points may be the address of the trusted website. Other PDAs, such as Blackberries and the like may be similarly used and may come pre-programmed with the website of address of a trusted website. Also, the same private/public key pair may be used for many different product to simplify the authentication.

The image information is sent to the trusted website, which carries out an authenticity operation.

Figure 5:
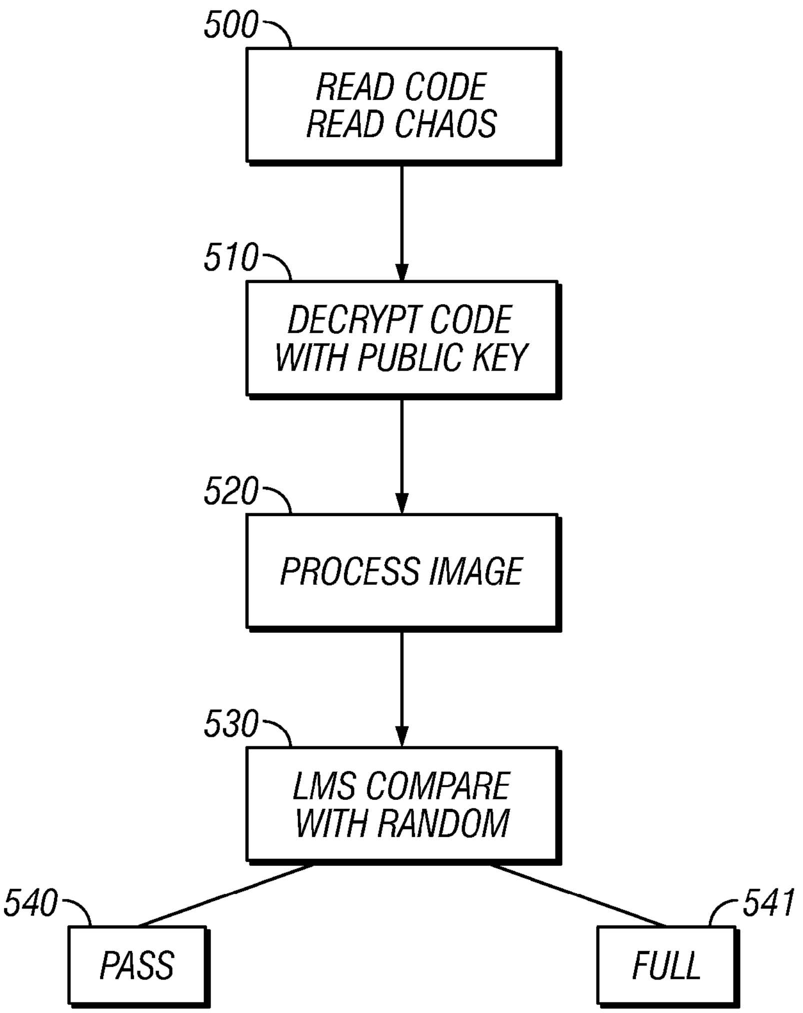
FIG. 5 shows a flowchart of operation of that system.

As an alternative, the embodiment of FIG. 4 may also be used with a program that runs in the phone or PDA 400. In that case, the phone or PDA carries out these operations, and the phone or PDA must store the public keys for the specified items in order to authenticate these items. Either the phone 400 or the website 410 runs the flowchart of FIG. 5. At 500, the system reads the code and reads the chaos code, using its camera. For example, the reading of the code may use the camera to obtain an image of a barcode, and to decode the barcode using techniques which are similar to those in CCD barcode scanners. The system also reads the chaos code, by obtaining an image of the chaos code. At 510, the system decrypts the chaos code using its public key. At 520, the image obtained at 500 is processed, using the same reduction technique which is used in 310. Again, for example, this may obtain minutia, or may obtain specified areas of the image. Other reduction techniques are also contemplated. At 530, the image which is reduced by 520 is compared with the chaos code. A least-mean-squares comparison can be used for example to see if the two images agreed by a specified amount for example 80%. Exact matches can also be required, but a less than 100% match may be useful to reduce false rejections.

If the least-mean-squares comparison is successful, an indication of pass is returned at 540, otherwise an indication of fail is returned at 541.

Another embodiment operates using the same techniques, but using code 110 that is not necessarily be chaotic. For example, code 110 may be one of a plurality of different first codes. As one example, there may be a thousand different first codes. Either the UPC or the printed part may then include some identifier, such as the date. The code is then formed as a one-way code indicative of the first code concatenated with the date.

This embodiment as the conceivable disadvantage that it may be simpler to copy. If an illegal copier obtains one of the codes, they can copy it exactly, to create other ones. However, this exact copy will be difficult to make, and may take time. This system can still produce fairly good and sophisticated protection, since the copier will only be able to exactly copy what is already been produced.

In this second embodiment, for example, the code 110 can be a code which is simply a string of numbers encoded into a barcode. The string of numbers can be a random number, and can be intended to be used only once. In that way, the database can recognize that the code is being pirated, and deactivate the use of that code.

Although only a few embodiments have been disclosed in detail above, other embodiments are possible and the inventor intends these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, the above describes only a specific type of one-way code, but there are many more sophisticated one-way codes that can be used. Any code which allows the public to authenticate the veracity, but yet prevents an illegal copying it can be used. Moreover, the above has described embodiments one; of which uses a chaotic function. Different chaotic functions other than the ones specifically described are contemplated. The second embodiment uses non-chaotic functions, which can be pictures, numbers, or any other feature. The above also describes the use of different kinds of information readers, but it should be understood that other kinds of information readers can alternatively be used. Also, the preferred application is for using these in detecting authentic goods, but different applications are also contemplated such as in tickets for events, and other authentication.

Also, the inventor(s) intend that only those claims which use the words “means for” are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned.

What is claimed is:

1. A method, comprising:

forming a first code and a second code directly on a readable part of a product, wherein said first code is formed from a chaotic portion on the readable part that has a chaotic layout created by a chaotic function, said chaotic portion formed directly on said readable part in a way that always forms chaotic results directly on said readable part;

said forming comprising using an encryption based technique to form said second code based on said chaotic layout of said first code that is formed directly on said readable part, in a way that a decrypted version of said second code can be compared with said first code; and determining that said product is authentic when said first code agrees with said decrypted version of said second code and determining that said product is not authentic when said first code does not agree with said decrypted version of said second code.

2. A method as in claim 1, wherein said using comprises using a public key of a public key/private key pair, to decrypt said second code.

3. A method as in claim 1, wherein said chaotic portion is formed by a process that will create a non-predictable pattern directly on the readable part each time that is different than a pattern created directly on the readable part at each other time.

4. A method as in claim 1, wherein said readable part is a label that also include UPC information.

5. A method as in claim 1, wherein said first code includes an image, said second code includes information indicative of the image, and wherein said determining comprises using a technique to determine similarities between images.

6. A method as in claim 5, wherein said determining comprises reducing an amount of information in the image obtained using said first code.

7. A method as in claim 6, wherein said determining similarities comprises comparing the codes using a least-mean-squares technique.

8. A method as in claim 1, further comprising using a personal communication device to obtain information indicative of the first and second codes, and using the personal communication device at a different time to send a personal communication.

9. A method as in claim 8, wherein said personal communication device is a cell phone.

10. A method as in claim 1, further comprising sending information indicative of the first and second codes to a remote database, and receiving a response from said remote database which indicates whether the product is genuine.

11. A method, comprising:

reading information from a label using a personal communication device which can also be used at a different time for at least one of making a telephone call or sending an e-mail;

decrypting at least one encrypted item from the information that is read to form a decrypted part; and based on said decrypting, indicating whether the information represents an authentic label, wherein said information includes at least a first unencrypted part, and a second encrypted part, and said indicating is based on a determination of whether the decrypted part matches with said unencrypted part, and wherein said unencrypted part is formed directly on said label via a chaotic process that cannot be controlled.

12. A method as in claim 11, further comprising sending the information to a remote computer that analyzes the information and determines whether the information represents an authentic label.

13. A method as in claim 11, wherein said first unencrypted part is formed by locations of an applied liquid on said label.

14. A method as in claim 13, wherein said unencrypted part is formed by a process that will create a non-predictable pattern directly on the label each time.

15. A method as in claim 11, wherein said reading comprises using a camera in the communication device to take a picture, and where said picture provides said information.

* * * * *